Patented Mar. 18, 1952

2,589,675

UNITED STATES PATENT OFFICE 2,589,675

PRODUCTION OF S-HYDROXYBENZYL O,O-DITHIOPHOSPHORIC ACID TRIESTERS

Elmer W. Cook, London, England, Philip H. Moss, Seldovia, Territory of Alaska, and Edwin O. Hook, Old Greenwich, Conn., assignors to American Cyanamid Company, New York, N. Y., a corporation of Maine No Drawing. Application November 29, 1949, Serial No. 130,062

4 Claims. (Cl. 260—461)

This invention relates to an improved and simplified method for the production of S-hydroxybenzyl dithiophosphoric acid O,O-diesters and to certain novel compounds of this general class. The process of the invention is of general utility for the production of any S-hydroxybenzyl O,O-dithiophosphoric acid triester; the new compounds are bis - (dithiophosphatomethyl) phenol sulfides and their metal salts, which can be produced by the new process.

The S-hydroxybenzyl O,O-dithiophosphoric triesters are useful as insecticides and fungicides and those compounds which are soluble in hydrocarbon oils are also useful as antioxidants and anticorrosives, particularly in refined hydrocarbon lubricating oils of the type now used in internal combustion engines. It is a principal object of our invention to provide a method for the preparation of these compounds from relatively inexpensive and easily obtainable raw materials.

The phenol sulfides and their metal salts, and particularly the di-(4-alkylphenol) sulfides in which the alkyl radicals contain from 1 to 18 or more carbon atoms, constitute a well known class of lubricating oil additives. It is a further object of our invention to provide new derivatives of this class of compounds wherein the phenol sulfide group is combined with two dithiophosphoric acid O,O-diester radicals.

Our invention is based on the discovery that formaldehyde-reactive phenols can be condensed with O,O-diesters of dithiophosphoric acid and formaldehyde by either of the following reactions:

(1)
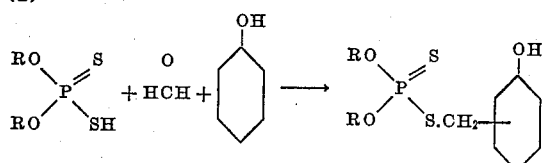

(2)
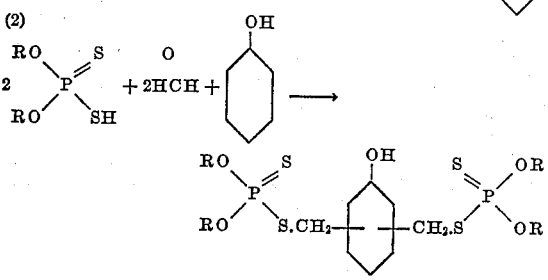

In the above equations each R represents an organic ester-forming radical; i. e., the radical of an alcohol or phenol such as an aliphatic or cycloaliphatic hydrocarbon radical or substituted hydrocarbon radical or an unsubstituted or substituted aryl radical. The O,O-diesters of dithiophosphoric acids of these various types are well known compounds; see, for example, U. S. Patents Nos. 2,364,284; 2,228,658 and Reissue 22,829, and any of the dithiophosphoric acid diesters described therein may be used. Inasmuch as the ester-forming radicals in the O,O-diesters of dithiophosphoric acid are non-functional groups, insofar as the reaction of the present invention is concerned, it follows that any such ester-forming radical may be used.

The novel condensation reaction of our invention is slightly exothermic in character and proceeds readily and completely when the ingredients are mixed together at relatively low temperatures such as at room temperature. Higher temperatures up to 80–90° C. may be employed in some cases, but are not usually necessary and present the disadvantage causing loss of sulfur from free O,O-dithiophosphoric acid diesters. Ordinarily the dithiophosphoric acid ester and the phenol and formaldehyde are simply mixed together and allowed to stand until the reaction has proceeded to completion, which ordinarily requires from about 30 minutes to about 10–12 hours or more. In some cases cooling means, such as cooling coils containing a flow of cold water or brine may be used to carry away excess heat from the reaction.

The condensation reaction may be carried out in the presence of non-reactive diluents if desired. Volatile hydrocarbons of the type of benzene, toluene, solvent naphtha and the like may be used for this purpose or an excess of one of the reagents, such as an excess of the phenolic component, may be used if desired. The condensation product is easily recovered from the reaction mixture by washing with water or a dilute aqueous sodium carbonate solution, or both, followed by heating the product under reduced pressure to strip off volatile impurities.

Any desired formaldehyde-reactive phenol may be used in practicing the process of our invention. By "formaldehyde-reactive phenol" we mean a phenol having at least one position ortho or para to the phenolic hydroxyl group available for substitution so that it is capable of condensing with formaldehyde. Such phenols include phenol itself and substituted monohydric phenols such as cresol and 2,4-xylenol as well as higher alkyl phenols such as those obtained by condensing phenol or toluol with butylene or propylene polymers and containing one or more long alkyl substituents of 3 to 18 carbon atoms. Similar alkyl phenols may be obtained by condensing phenol or toluol with chlorinated aliphatic hydrocarbons, such as a chlorinated petroleum fraction of 10 to 16 carbon atoms, using aluminum chloride, hydrofluoric acid, phosphoric acid or other suitable catalyst.

One of the most important advantages of the process of our invention resides in the fact that it can be applied to phenol sulfides with the formation of a new class of chemical compounds. We have found that by condensing one mol of a formaldehyde-reactive phenol sulfide with two mols of formaldehyde and two mols of an O,O-diester of dithiophosphoric acid there is produced a bis-(dithiophosphatomethyl) phenol sulfide corresponding to the following formula:

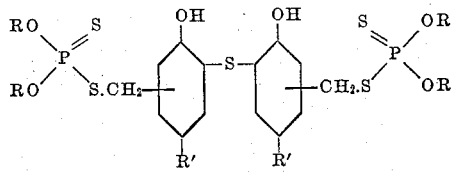

in which R is an aliphatic radical of 1 to 18 carbon atoms and R' is hydrogen or an aliphatic radical of 1 to 18 or more carbon atoms. These new compounds are liquids which are soluble in hydrocarbon lubricating oils and possess good antioxidant properties therefor. By treatment with salt-forming metal compounds they can be converted into their corresponding metal salts which possess both antioxidant and detergent properties for hydrocarbon lubricating oils.

As has been stated, the phenol sulfides and their metal salts are well known lubricating oil additives and are described, for example, in U. S. Patents Nos. 2,362,289 to 2,362,293 inclusive. Any of the phenol sulfides described in these patents may be used; however, we prefer to employ those prepared from 4-alkyl phenols as in these compounds the outer positions ortho to the phenolic hydroxy groups are unsubstituted and therefore the condensation reaction with the formaldehyde and O,O-dithiophosphoric acid diester takes place at these positions with the formation of heat-stable condensation products. Representative phenol sulfides which may be used are 4-methylphenol sulfide, 4-tert. butyl sulfide, 4-dodecylphenol sulfide and 4-octadecylphenol sulfide.

As is noted above, any O,O-dialiphatic dithiophosphoric acid diester, including dicycloalkyl dithiophosphoric acid esters or any O,O-diaryl dithiophosphoric acid ester or any mixed O,O-diester of dithiophosphoric acid may be used in practicing the process of our invention. When compounds having a relatively high percentage of combined phosphorus and sulfur are desired as in the production of lubricating oil antioxidants having a high activity at relatively low temperatures which is sometimes required in turbine oils and anticorrosion oils, it is preferable to employ an O,O-dialkyl dithiophosphoric acid in which the alkyl groups are of relatively low molecular weight, such as methyl, ethyl, propyl, or butyl radicals. Dialkyl dithiophosphoric acids of higher molecular weight may, of course, be employed such as diamyl, di-n-hexyl, dicyclohexyl or dioctyl dithiophosphoric acids, as well as the didecyl, didodecyl, ditetradecyl, or dioctadecyl dithiophosphoric acids. Where the dithiophosphoric acids are to contain aryl radicals the O,O-diphenyl, O,O-dialkylphenyl, and O,O-di- naphthyl dithiophosphoric acids may be employed. Still other diaryl dithiophosphoric acids may be used including O,O-dichlorophenyl or dibromphenyl dithiophosphoric acids.

In carrying out the process of our invention we prefer to employ ordinary aqueous formaldehyde such as 37% formalin solutions. However, para-formaldehyde may be employed if desired. In some cases it may be desirable to first react the formaldehyde or para-formaldehyde with the phenol or phenol sulfide to form a methylol derivative, which is then condensed with the O,O-dithiophosphoric acid diester and it is understood that this method of procedure is included within the scope of the invention. In most cases, however, a better control of the reaction is obtained either by mixing the three ingredients simultaneously or by first mixing together the formaldehyde and the O,O-diester of dithiophosphoric acid, usually with positive cooling, and then adding the phenolic ingredient with agitation to complete the reaction.

As is evident from reactions (1) and (2) the molar ratio of the phenolic ingredient to the formaldehyde and dithiophosphoric acid diester may be varied throughout the range of 1:1 up to 1:2 or more. When equimolecular quantities are used a product containing only one dithiophosphoric acid O,O-diester is obtained, whereas when a 1:2 ratio is employed a bis-compound containing two dithiophosphoric acid ester groups per molecule is obtained. In the case of the simple mononuclear phenols such as phenol itself and 4-alkyl phenols the use of a 1:2 ratio produces an S,S'-hydroxyxylyl dithiophosphoric acid diester as is shown in reaction (2). The compounds produced by the reaction of our invention are described generally as S-hydroxylbenzyl dithiophosphoric acid O,O-diesters, it being understood that the S,S'-diesters are included in this terminology.

The novel products of the present invention are preferably used in lubricating oils in relatively small quantities which may vary from about 0.1% up to 4–5% or greater, depending on the particular oil and on the degree of protection desired therein. In automobile engine oils, quantities on the order of 0.2% to 2–3% are usually employed. The novel antioxidants of this invention are compatible with all of the common used detergents, stabilizers, sludge-inhibitors and other ingredients of compounded oils and may be used in conjunction with smaller or larger quantities of aliphatic or aromatic sulfonates such as calcium petronate, alkyl phenol sulfides and their polyvalent metal salts, and metal salts of oxygen- or sulfur-containing acids of phosphorus such as those described in U. S. Patents Nos. 2,364,284 and 2,228,658 and Reissue 22,829. These and other additives are usually employed in the oils in amounts of about 0.1–5%, most commonly in quantities of about 0.5–2%, in admixture with the antioxidants of the present invention.

The invention will be further illustrated by the following specific examples. It should be understood, however, that although these examples may describe in detail some of the specific features of the invention, they are given primarily for purposes of illustration and the invention in its broader aspects is not limited thereto.

*Example 1*

A mixture of 38 grams (0.25 mol) of p-tert. butylphenol, 53 grams (0.25 mol) of distilled diethyldithiophosphoric acid and 25 grams (0.32 mol) of 37% aqueous formaldehyde solution was stirred for 4 hours at room temperature. The reaction product separated out on standing as a water-insoluble layer which was washed with water and heated on a steam bath at reduced pressure to remove volatile impurities. The yield was 76 grams of ortho-(O,O-diethyldithiophosphatomethyl)-p-tert. butylphenol, a light-colored, free-flowing liquid which was soluble in lubricating oil. This product has the formula

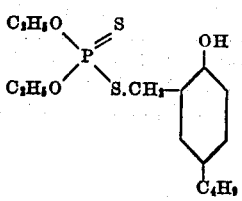

A sample was tested as an antioxidant by the Underwood corrosion test using cadmium-silver alloy bearings as test material. A 1500 cc. sample of Mid-Continent base lubricating oil of SAE 30 grade containing 0.5% by weight of the additive and 0.04% iron naphthenate, based on the $Fe_2O_3$ equivalent, as oxidation catalyst was heated for 10 hours at 325° F. while continuously spraying portions of the oil against two freshly sanded alloy bearings. The total loss was 120 milligrams, whereas the loss with a sample of the same oil containing the same quantity of iron naphthenate but no antioxidant was 1097 milligrams.

*Example 2*

A mixture composed of 25 grams (0.32 mol) of 37% formalin, 19 grams (0.125 mol) of p-tert. butylphenol and 53 grams (0.25 mol) of distilled diethyldithiophosphoric acid was stirred for 3½ hours and then allowed to stand for 16 hours at room temperature. The water-insoluble layer was washed thoroughly with water and stripped by heating under reduced pressure. The product, a light tan-colored and moderately viscous liquid, was the 2,6 - bis(O,O - diethyldithiophosphatomethyl)-4-tert. butylphenol of the formula

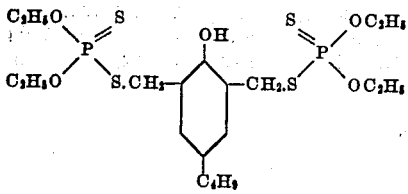

*Example 3*

Twenty-one grams (0.25 mol) of 37% formalin was added slowly and with ice bath cooling to 42 grams (0.2 mol) of distilled diethyldithiophosphoric acid (Neutralization Equivalent 207), after which 59 grams (0.2 mol) of ortho-diethylaminomethyl-p-tert. octylphenol was introduced slowly and with agitation to produce a thick, pasty mass. This was diluted with 25 cc. of dioxane, warmed for 2½ hours on a steam bath and allowed to stand overnight at room temperature. Ethylene dichloride was then added and the solution was washed with water. The solvent was distilled at reduced pressure, leaving 99 grams of a thick, light colored oil. The composition of the product is shown by the formula:

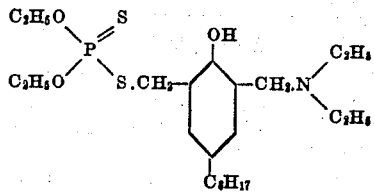

*Example 4*

One-fourth mol each of p-hexylphenol (45 grams) and diethyldithiophosphoric acid (53 grams) were mixed and 25 grams (0.31 mol) of 37% formalin was added. The mixture was stirred at room temperature for 6½ hours, after which it separated into layers upon standing. The lower non-aqueous layer was drawn off and washed with water, dried over calcium sulfate and stripped by heating at reduced pressure. The yield was 90 grams of a very light colored liquid which was soluble in lubricating oil. It was the ortho - (O,O - diethyldithiophosphatomethyl)-p-hexylphenol of the formula

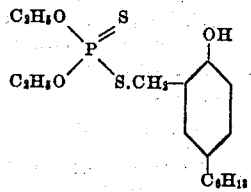

*Example 5*

Thirty grams (0.182 mol) of diethyldithiophosphoric acid and 5.46 grams (0.18 mol) of paraformaldehyde were mixed with 30 cc. of dioxane and heated on a steam bath. When solution was complete there was added 19 grams (0.205 mol) of phenol and the mixture was agitated and allowed to stand overnight. The next day it was agitated for 2 hours on a steam bath and then stripped under 8 mm. of mercury pressure at 95° C. The yield was 51 grams of a light-colored clear liquid, which was the ortho-(O,O-diethyldithiophosphatomethyl)-phenol.

*Example 6*

One-half mol (47 grams) of phenol was dissolved in 0.25 mol (67 grams) of distilled diisobutyldithiophosphoric acid and 23 grams (0.27 mol) of 37% formalin was added. The mixture was stirred at room temperature for 3 hours and then at 90° C. for 2 hours longer after which it was allowed to stand overnight at room temperature. The reaction product was then washed with water, dried over calcium sulfate, filtered and stripped on a steam bath at reduced pressure. The product was a dark-colored thin liquid the composition of which is shown by the formula:

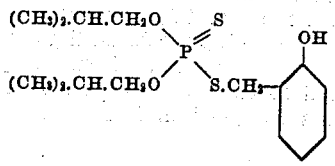

A sample of the product was dissolved in Mid-Continent base SAE 30 grade lubricating oil to a 0.5% solution. The bearing corrosion loss was 18 milligrams when the oil was tested as described in Example 1.

*Example 7*

The procedure of Example 6 was repeated but 54 grams of a commercial grade of cresylic acid was substituted for the phenol. The yield was 91 grams of a dark-colored, non-viscous liquid that was soluble in lubricating oil.

Example 8

A mixture of 79 grams (0.25 mol.) of di-(methylisobutylcarbinyl) - dithiophosphoric acid (Neutralization Equivalent 314), 24 grams (0.25 mol) of phenol, and 25 grams (0.31 mol) of 37% formalin was stirred for 3 hours and then allowed to stand overnight at room temperature. The non-aqueous layer was washed with water, dried over calcium sulfate, and stripped at reduced pressure on a steam bath. The yield was 98 grams of a light-colored liquid that was soluble in lubricating oil. It was the ortho-(O,O-dihexyldithiophosphatomethyl)-phenol of the formula:

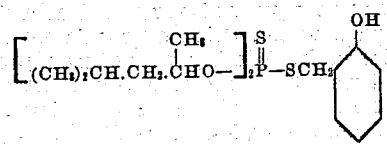

A sample of the product was dissolved in Mid-Continent base SAE 30 grade lubricating oil to a 0.5% solution. The bearing corrosion loss was 14 milligrams when the oil was tested as described in Example 1.

Example 9

A mixture of 39 grams (0.16 mol) of p-cresol sulfide, 70 grams (0.33 mol) of distilled diethyldithiophosphoric acid (Neutralization Equivalent 212), and 30 grams (0.37 mol) of 37% formalin was prepared and stirred for 6 hours at room temperature. The product was separated from the water layer, dissolved in benzene and washed twice with water. The benzene was then distilled under reduced pressure leaving 102 grams of a light, tan-colored clear liquid which was the bis-(O,O - diethyldithiophosphatomethyl - cresol sulfide of the formula:

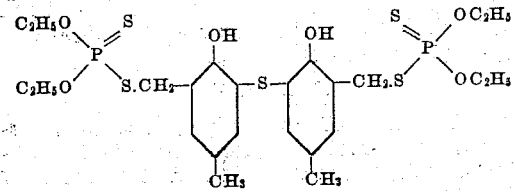

Example 10

By the procedure described in Example 9 the bis - (2-hydroxy-3 - O,O - diethyldithiophosphatomethyl-5-tert. butylphenyl) sulfide was prepared from 45 grams (0.73 mol) of di-(2-hydroxy-5-tert. butylphenyl) sulfide, 60 grams (0.35 mol) of distilled diethyldithiophosphoric acid (Neutralization Equivalent 213) and 26 grams (0.32 mol) of 37% formalin. The yield was 95 grams of a light-colored liquid which was found to possess good antioxidant properties when tested at 0.5% concentration in lubricating oil. Its composition is shown by the formula

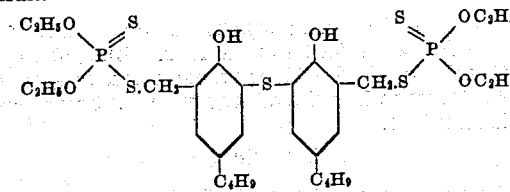

A sample of the product was dissolved in Mid-Continent base SAE 30 grade lubricating oil to a 0.5% solution. The bearing corrosion loss was 0 milligrams when the oil was tested as described in Example 1.

Example 11

A toluene solution of 46 grams (0.105 mol) of di-(2-hydroxy-5-tert. octylphenyl) sulfide was prepared and 42 grams (0.21 mol) of distilled diethyldithiophosphoric acid (Neutralization Equivalent 200) and 20 grams (0.25 mol) of 37% formalin was added with stirring. The mixture was agitated for 5 hours at room temperature, allowed to stand overnight, and then washed with water and stripped under reduced pressure. The product weighed 78 grams and was a very thick, cloudy liquid of the formula.

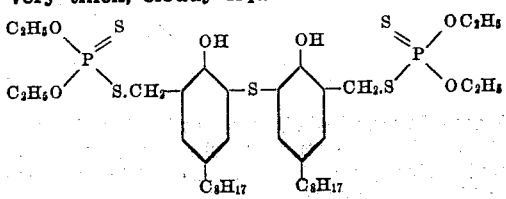

Example 12

One-tenth mol (25 grams) of cresol sulfide was dissolved in benzene and 54 grams (0.2 mol) of di-n-butyldithiophosphoric acid and 18 grams (0.22 mol) of 37% formalin was added. The mixture was stirred at 25° C. for 4 hours, after which the benzene solution was washed with water and the solvent removed by vacuum distillation. The yield was 83 grams of bis-(O,O-di-n-butyldithiophosphatomethyl)-cresol sulfide, a dark-colored, clear, thin liquid that was soluble in lubricating oil. A sample of the product was dissolved in Mid-Continent base SAE 30 grade lubricating oil to an 0.5% solution. The bearing corrosion loss was 8 milligrams when the oil was tested as described in Example 1.

Example 13

Bis - (2 - hydroxy - 3 - O,O - dibutyldithiophosphatomethyl-5-tert. butylphenyl) sulfide was prepared by agitating a mixture of 0.7 mol (47 grams) of di-(2-hydroxy-5-tert. butylphenyl) sulfide with 0.33 mol (80 grams) of di-n-butyldithiophosphoric acid and 0.33 mol (27 grams) of 37% formalin for 5 hours at room temperature, followed by water washing and stripping as previously described. The yield was 129 grams of a light-colored, oil-soluble liquid of the formula:

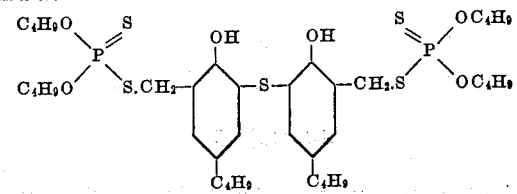

What we claim is:

1. A method of producing an S,S'-hydroxyxylyl dithiophosphoric acid diester which comprises reacting together two molecular proportions of an O,O-diester of dithiophosphoric acid, two molecular proportions of formaldehyde and one molecular proportion of a phenol unsubstituted in at least one position ortho or para to the phenolic hydroxyl group.

2. A method according to claim 1 in which the phenol is a 4-alkylphenol.

3. A method of producing a bis-(dithiophosphatomethyl) phenol sulfide which comprises condensing one mol of a phenol sulfide unsubstituted in at least one position ortho or para to the phenolic hydroxyl group with two mols of formaldehyde and two mols of an O,O-diester of dithiophosphoric acid.

4. A method according to claim 3 in which the phenol sulfide is a di-(4-alkyphenol) sulfide.

ELMER W. COOK.
PHILIP H. MOSS.
EDWIN O. HOOK.

REFERENCES CITED

The following references are of record in the file of this patent:

UNITED STATES PATENTS

| Number | Name | Date |
|---|---|---|
| 2,396,839 | Evans et al. | Mar. 19, 1946 |
| 2,530,339 | Mikeska | Nov. 14, 1950 |